(No Model.) 2 Sheets—Sheet 1.
E. THOMSON.
METHOD OF ELECTRIC WELDING AND BRAZING.
No. 403,708. Patented May 21 1889.
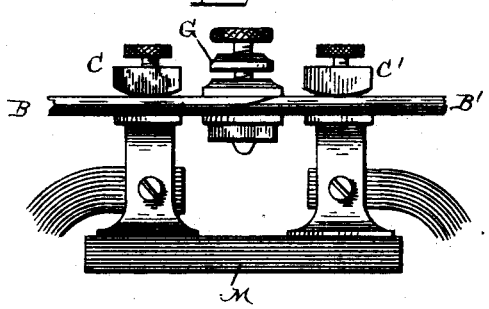
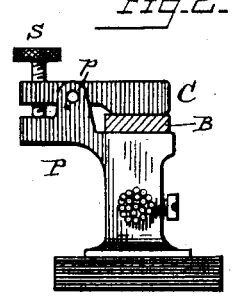
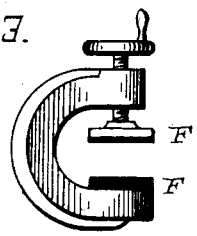
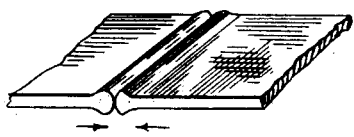
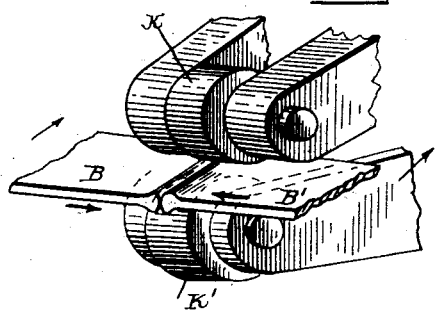
Witnesses
Inventor
Elihu Thomson.
By Attorney (No Model.)

2 Sheets—Sheet 2.

E. THOMSON.
METHOD OF ELECTRIC WELDING AND BRAZING.

No. 403,708. Patented May 21 1889.

Witnesses
Ira R. Steward
Wm H. Capel

Inventor
Elihu Thomson,
By his Attorney
H. A. Townsend

UNITED STATES PATENT OFFICE.

ELIHU THOMSON, OF LYNN, MASSACHUSETTS.

METHOD OF ELECTRIC WELDING AND BRAZING.

SPECIFICATION forming part of Letters Patent No. 403,708, dated May 21, 1889.

Original application filed February 21, 1887, Serial No. 228,277. Divided and this application filed October 19, 1888. Serial No. 288,594. (No model.)

*To all whom it may concern:*

Be it known that I, ELIHU THOMSON, a citizen of the United States, and a resident of Lynn, in the county of Essex and State of Massachusetts, have invented certain new and useful Improvements in Electric Welding and Brazing, of which the following is a specification.

My invention relates to methods or processes of forming welded or brazed joints between two metal pieces or portions of a metal object; and it consists, essentially, in passing a heating electric current through the material from one side to the other of the joint, and then, when the material is properly heated, subjecting the joint itself to compression by suitable tools forced upon the joint in a lateral or transverse direction—that is to say, in a direction transverse to the general common line or plane in which the joint and the object or portions of object adjacent to the joint and on either side thereof lie.

The tools or means used for effecting compression or applying the pressure may be dies, clamps, rollers, or other instrumentalities suitably forced against the hot metal to consolidate and perfect the weld or brazing.

The heating electric current may be any source proper for delivering a current of the requisite volume—such, for instance, as that described in my prior patent, No. 347,140.

My invention is applicable to the formation of either lap or butt joints.

The invention consists, further, in giving to the material at either side of a butt-joint an enlargement by upsetting or otherwise preparatory to the operation of heating and applying the transverse pressure.

My invention consists, further, in the special improved details of the process, as will be herein further described, and then more particularly specified in the claims.

Figure 9:
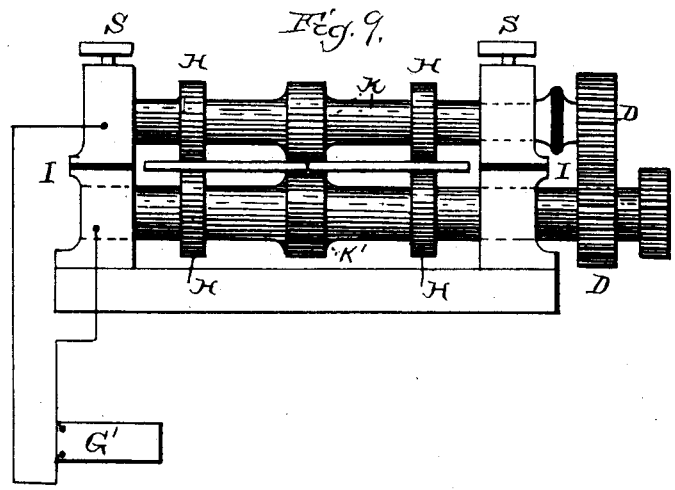
Figure 10:
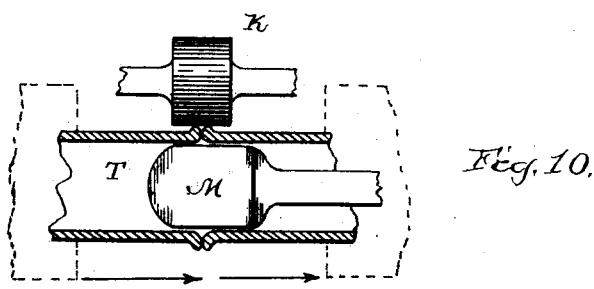

In the accompanying drawings, forming part of this specification, Figure 1 is a front elevation of an apparatus suitable for practicing my invention. Fig. 2 is a side view of a part of the same. Fig. 3 is a side view of the clamp or die shown in Fig. 1. Fig. 4 shows a joint formed by the device of Fig. 1. Figs. 5 and 6 show the manner of forming the ends or abutting portions of bars or plates preparatory to the making of a welded butt-joint in accordance with my invention. Fig. 7 shows another form of apparatus suitable for use in practicing my invention. Fig. 8 shows the joint as formed between the plates, Fig. 6. Fig. 9 shows another form of apparatus similar to Fig. 7. Fig. 10 illustrates a special application of my invention and the devices to be used therein.

In Fig. 1, C C' are clamps or holders, of any desired character, mounted on a plate or base, M, and insulated from one another. The clamps connect by heavy cables or other devices with a source of very heavy electric current, as described in my prior patents before referred to. The clamps serve to hold the bars or pieces to be welded and to convey current thereto. In the present case the bars B B' in the clamps are shown as arranged to be united by a lap-welded joint where their ends match.

The clamps C C' are good conductors and are kept clean, making such good contact with the piece or pieces B B' that current passes so as to heat that part of B B' between the clamps to the welding or brazing heat. A pressure-clamp or die-press, G, is arranged to be used to press laterally upon the bars at the lap-joint and to force the two intimately into contact. Brass and borax may also be applied where the joint is wanted to braze the pieces while pressed and held by the clamps.

The view Fig. 2 shows how the clamp C may be constructed to permit easy insertion and removal of pieces operated upon.

S is a screw, which bears on an extension of the clamp-pillar P and forces the clamp C down hard upon the piece B, pivots at *p* being provided.

The clamp G may be made, as shown in Fig. 3, in the ordinary way or in any other way to give the pressure. It may carry flat or curved die-faces F F, if it be desired to modify the shape at that part of the metal B B' operated upon. The die-surfaces F F should be faced with carbon, soapstone, or other non-conductor of heat of refractory nature.

The ends of bars formed as in Figs. 4, 5, and 6 may be placed together and united by pressure applied by G laterally, so as to make a perfect weld when heated by the current.

In forming a butt-welded joint by the application of lateral pressure it is desirable that there should be an enlargement of the blank at the abutting edges, in order that on the application of the lateral pressure material may be present in sufficient quantity to form a good union between the pieces without reducing the thickness at the finished joint. This enlargement may be given to the pieces or object in any desired manner, but is conveniently formed by upsetting the material preparatory to the welding operation.

In cases where an extended seam or joint is to be formed the stationary pressure-clamp G may be replaced by rollers, as K K', Fig. 7, connected to opposite sides of the circuit, so as to form electrodes between which the current passes through the metal to be operated upon. Thus in the case of flat plates, as in Fig. 6, to be welded edge to edge to form a longitudinal seam or joint, it is well to roll the joint by pressure-rolls during its formation, and in this case the rollers may be made massive and of good conductor of electricity, not too easily melted, and may be used to press the sheet or plate and convey current thereto for heating the joint for welding, successive portions of the seam or joint, as the strips or plates, passing through the rollers.

In Fig. 7 the plates B B', whose edges where the joint is to be made have been previously upset, are firmly pressed together edgewise and the rollers K K' caused to press on each side oppositely while the plates progress through the rollers slowly. A very heavy current passing at the same time from roller to roller through the upset jointing-edge softens the metal and causes welding. A flux, as borax, is sometimes applied to the joint. The effect or result, as shown in Fig. 8, is a single plate.

In Fig. 9 the rolls K K' are arranged to be adjusted as to proximity by screws s s, as usual in rolling-mills, and are kept insulated at I I, but driven by gearing D, so as to move together. Guiding-rolls H H H, insulated from K and K', are suitably placed according to the work to be guided or fed. Very heavy cables connect rolls K K' to the source of current G'.

It will be understood that the current need not be passed from roll to roll, as it would be clearly within my invention to pass the current, as in Fig. 1, between clamping-supports or otherwise, so that the part to be operated upon by the rolls is heated by the electric current during the manipulation. Thus when a tube is to be welded, either by the lap or butt weld, current may be caused to traverse it, as in Fig. 1, to heat the portion to be operated upon, and an external roll, K, Fig. 10, applied to shape the exterior and assist the union, while an internal mandrel, M, prevents collapse.

The roll K may be caused to traverse around the circumference of the tube T; or the tube T may be revolved and K pressed against its side, while the heat is maintained by the current.

My present application forms a division of a prior application for patent filed by me February 21, 1887, Serial No. 228,277.

I do not herein claim the improved process of forming a junction between sections of pipe or tubing, consisting in passing a current of electricity across the joint to heat the same to the welding temperature and completing the welding operation over a mandrel introduced into the pipe or other article beneath the joint, as this process forms the subject of another application for patent filed by me May 1, 1889.

What I claim as my invention is—

1. The herein-described method of forming a welded or brazed joint, consisting in passing an electric current through the material from one side to the other of the joint and then applying lateral pressure directly to the material at the part where the joint or weld is to be formed.

2. The herein-described process of forming a butt-welded joint, consisting in forming or providing the metal with an enlargement at the point of abutment, passing a heating electric current through the material, and then applying lateral pressure to the material directly at the joint, as and for the purpose described.

3. The herein-described improved method of forming an elongated metal joint, consisting in passing a heating electric current across the joint and applying transverse or lateral pressure to successive portions of the object directly at the joint, and for the purpose described.

4. The herein-described process of electric welding, consisting in passing an electric current of large heating effect across the joint and then compressing or compacting the joint by pressure applied laterally in a direction transverse to the general line or plane, including the joint and the pieces or portions of object adjacent to the joint.

Signed at Lynn, in the county of Essex and State of Massachusetts, this 15th day of October, A. D. 1888.

ELIHU THOMSON.

Witnesses:
J. W. GIBBONEY,
W. O. WAKEFIELD.